United States Patent
Van Phan et al.

(10) Patent No.: US 11,985,699 B2
(45) Date of Patent: May 14, 2024

(54) ULTRA-RELIABLE LOW-LATENCY COMMUNICATIONS SUPPORT USING GRANT FREE TRANSMISSIONS

(71) Applicant: Nokia Technologies Oy, Espoo (FI)

(72) Inventors: Vinh Van Phan, Oulu (FI); Ling Yu, Kauniainen (FI); Zexian Li, Espoo (FI); Bikramjit Singh, Espoo (FI); Mikko Aleksi Uusitalo, Helsinki (FI); Emad Farag, Flanders, NJ (US)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 15/586,655

(22) Filed: May 4, 2017

(65) Prior Publication Data
US 2018/0324852 A1    Nov. 8, 2018

(51) Int. Cl.
*H04W 72/02*    (2009.01)
*H04B 7/02*    (2018.01)
(Continued)

(52) U.S. Cl.
CPC .............. *H04W 74/02* (2013.01); *H04B 7/02* (2013.01); *H04L 1/08* (2013.01);
(Continued)

(58) Field of Classification Search
CPC . H04W 74/02; H04W 28/0278; H04W 72/02; H04W 74/004; H04W 84/042
See application file for complete search history.

(56) References Cited

U.S. PATENT DOCUMENTS

| | | | |
|---|---|---|---|
| 2014/0293970 A1* | 10/2014 | Damnjanovic | ....... H04L 5/0044 370/336 |
| 2014/0372997 A1* | 12/2014 | Furushige | ............... G06F 8/658 717/168 |

(Continued)

FOREIGN PATENT DOCUMENTS

| | | |
|---|---|---|
| CN | 102577209 A | 7/2012 |
| CN | 103167021 A | 6/2013 |

(Continued)

OTHER PUBLICATIONS

Ericsson Tdoc R2-1700905, "Summary of RAN2 solutions for URLLC", 3GPP TSG-RAN WG2 #97, Feb. 2017; 7 pgs.

(Continued)

*Primary Examiner* — Derrick W Ferris
*Assistant Examiner* — M Mostazir Rahman
(74) *Attorney, Agent, or Firm* — Harrington & Smith

(57) ABSTRACT

A user equipment (UE) selects first and second radio resources from respective first and second pools of radio resources. In one example these are primarily allocated for contention-free and scheduling-based channel access, respectively. Content to duplicate in parallel communications is selected based at least on a characteristic of uplink data waiting to be sent (such as size) and/or on the selected first and second radio resources (such as timing difference between them). The UE transmits the selected content on each of the selected first and second radio resources. In the examples the content to duplicate was selected from among the uplink data to send and a scheduling request message. In various embodiments one of these transmissions indicates it's a duplicate, and the duplicated scheduling request message is transmitted on the first resource with the uplink data. These teachings are particularly useful for URLLC data.

18 Claims, 3 Drawing Sheets

20, serving gNB scheduling request on contention-free channel grant-free data transmission on contention-based channel

10, UE

(51) Int. Cl.
*H04L 1/08* (2006.01)
*H04W 28/02* (2009.01)
*H04W 72/04* (2023.01)
*H04W 74/00* (2009.01)
*H04W 74/02* (2009.01)
*H04L 1/00* (2006.01)
*H04W 72/543* (2023.01)
*H04W 84/04* (2009.01)

(52) U.S. Cl.
CPC ....... *H04W 28/0278* (2013.01); *H04W 72/02* (2013.01); *H04W 72/04* (2013.01); *H04W 74/004* (2013.01); *H04L 1/0072* (2013.01); *H04W 72/543* (2023.01); *H04W 84/042* (2013.01)

(56) References Cited

U.S. PATENT DOCUMENTS

| | | | |
|---|---|---|---|
| 2015/0257144 A1 | 9/2015 | Hooli et al. | 72/413 |
| 2016/0345377 A1* | 11/2016 | Lindoff | H04W 88/06 |
| 2017/0019882 A1 | 1/2017 | Nimbalker et al. | 72/42 |
| 2017/0019914 A1 | 1/2017 | Rune et al. | |
| 2017/0048857 A1* | 2/2017 | Vajapeyam | H04W 28/0273 |
| 2018/0049227 A1* | 2/2018 | Moon | H04W 72/0446 |
| 2018/0167182 A1* | 6/2018 | Cao | H04L 5/0048 |
| 2018/0241671 A1* | 8/2018 | Bosch | H04L 69/22 |
| 2018/0255611 A1* | 9/2018 | Li | H04W 4/70 |
| 2018/0270839 A1* | 9/2018 | Loehr | H04W 72/14 |
| 2018/0279262 A1* | 9/2018 | Babaei | H04L 1/1848 |
| 2019/0349954 A1* | 11/2019 | Quan | H04W 72/1268 |
| 2020/0022106 A1* | 1/2020 | Kim | H04L 1/22 |
| 2020/0029252 A1* | 1/2020 | Marquezan | H04W 36/0027 |

FOREIGN PATENT DOCUMENTS

| | | | |
|---|---|---|---|
| CN | 104025689 A | | 9/2014 |
| CN | 104272842 A | | 1/2015 |
| CN | 106575994 A | | 4/2017 |
| KR | 20170037144 | * | 8/2016 |
| WO | WO 2016078699 A1 | | 5/2016 |

OTHER PUBLICATIONS

"Simultaneous scheduling request and data transmission for uplink URLLC", Qualcomm Incorporated, 3GPP TSG-RAN WG1 NR #88-bis, R1-1705616, Apr. 2017, 11 pages.

* cited by examiner

ULTRA-RELIABLE LOW-LATENCY COMMUNICATIONS SUPPORT USING GRANT FREE TRANSMISSIONS

TECHNOLOGICAL FIELD

The described invention relates to wireless communications, and more particularly to low latency and high reliability data communications.

BACKGROUND

Improvements to wireless radio access technologies continue so as to handle increased data volumes and larger numbers of subscribers. The 3GPP organization is developing a new radio system (commonly referred to as NR or $5^{th}$ Generation/5G) to handle peak data rates of the order of ~10 Gbps (gigabits per second) while also satisfying ultra-low latency requirements that are not achievable in 4G. 5G intends to utilize some radio spectrum below 6 GHz but primarily above 6 GHz in the centimeter and millimeter-wave (mmWave) bands. Three of the major goals for 5G systems is to support massive multiple-input-multiple-output MIMO (m-MIMO) communications, ultra-reliable low-latency communications (URLLC), and mobile broadband (MBB). Systems employing m-MIMO are characterized by a much larger number of antennas as compared to LTE (E-UTRAN) systems, as well as finer beamforming and a higher antenna gain. URLLC communications are to achieve 0.99999 reliability over 0.5 milliseconds (ms). This should therefore be applied also for a scheduling request (SR) of URLLC which may need to be sent at any instant in time resolved into per x mini-slots of a fraction of a 0.5/0.125 ms slot (or even a shorter slot).

Both grant-based and grant-free uplink transmissions are known in the art. As an example of grant-based or scheduling-based transmissions (also referred to as contention-free), in the LTE radio access technology a user equipment (UE) with uplink (UL) data to send will send a scheduling request for UL radio resources and the eNB will reply with a PDCCH that specifically grants/allocates UL radio resources to that specific UE. As an example of grant-free transmissions, in a WiFi system (generally IEEE 802.11 family) the UE/station listen to a channel and is allowed to transmit its UL data to the access point if it hears no other transmissions for a prescribed period of time. The grant-free protocol is also referred to as contention-based since if there are multiple UEs with data to send they essentially contend for access to the uplink channel. Several modern radio access technologies employ both grant-based and grant-free techniques, sometimes in parallel on different channels and sometimes alternating in time periods on the same channel. While the network allocates uplink radio resources in both cases, for the case of grant-based the allocation is specific to a UE whereas for the case of grant-free the channel is allocated on which UEs content for a transmission opportunity but this allocation is not any specific UE.

Using grant-free uplink transmission (GFUT) over a contention based channel has been studied for URLLC; see for example document R1-1705616 by Qualcomm, Inc. entitled *Simultaneous scheduling request and data transmission for uplink URLLC* [3GPP TSG-RAN WG1 NR #88-bis; Spokane, USA; 3-7 Apr. 2017]. It is known that with a proper resource configuration GFUT can offer a channel access delay very close to zero, which is highly desirable for the latency requirement of URLLC. It is also known that GFUT over a contention based channel is unable to meet the reliability requirements of URLLC. Further, in practice the GFUT approach may not be flexible enough to adapt to different kinds of traffic demands, which becomes manifest in different packet sizes and packet arrival rates.

It follows then that URLLC may still need to rely on scheduling/grant-based transmissions (including possible retransmission or duplication as is well known in the cellular radio arts) as the base-line for ensuring the reliability requirement for URLLC for various types of traffic. The starting point for grant-based transmission is the UE's scheduling request (SR), and in the context of URLLC the SR must be ultra-reliable and fast as well.

The above-mentioned document R1-1705616 also considers that GFUT and a corresponding SR can be transmitted simultaneously, with limited coordination between the GFUT and SR so the SR indicates to the gNB (base station of a 5G network) that the UE has attempted a GFUT. This allows the gNB to schedule resources for any second and subsequent re-transmissions if needed (for example, hybrid-automatic-repeat-request HARQ re-transmissions). FIG. 1 illustrates an example of dual GFUT and SR transmissions as outlined in document R1-1705616, in which the UE 10 transmits to its serving gNB 20 in a 5G system a SR on a contention-free/scheduling-based channel and in parallel it transmits its uplink data as a GFUT on a contention-based channel. Both channels are allocated by the gNB 20, but for the SR the UE's UL data is sent later on radio resources specifically allocated in response to that SR whereas the GFUT on the contention channel is the UE's transmission of its UL data.

Embodiments of these teachings improve upon this parallel GFUT/SR technique to meet the requirements of URLLC, though the concepts and principles disclosed herein are not limited only to URLLC or even to 5G systems.

SUMMARY

According to a first aspect of these teachings there is a method comprising: selecting a first radio resource from a first pool of radio resources; selecting a second radio resource from a second pool of radio resources; selecting which content to duplicate in parallel communications based at least on a characteristic of uplink data waiting to be sent and/or on the selected first and second radio resources; and transmitting the selected content on each of the selected first and second radio resources.

According to a second aspect of these teachings there is an apparatus, such as a user equipment or components thereof comprising at least one computer readable memory storing computer program instructions and at least one processor. The computer readable memory with the computer program instructions is configured, with the at least one processor, to cause the apparatus/user equipment to perform actions comprising: select a first radio resource from a first pool of radio resources; select a second radio resource from a second pool of radio resources; select which content to duplicate in parallel communications based at least on a characteristic of uplink data waiting to be sent and/or on the selected first and second radio resources; and transmit the selected content on each of the selected first and second radio resources.

According to a third aspect of these teachings there is a computer readable memory storing computer program instructions that, when executed by one or more processors, cause a host apparatus such as user equipment to perform actions that include: selecting a first radio resource from a first pool of radio resources; selecting a second radio resource from a second pool of radio resources; selecting which content to duplicate in parallel communications based at least on a characteristic of uplink data waiting to be sent and/or on the selected first and second radio resources; and transmitting the selected content on each of the selected first and second radio resources.

These and other aspects are detailed further below with particularity.

DETAILED DESCRIPTION

Figure 1:
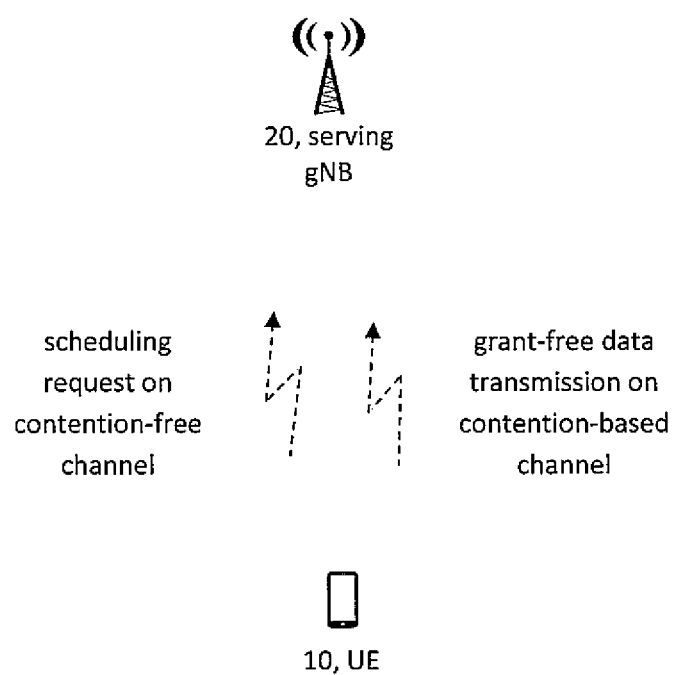
FIG. 1 is a schematic diagram illustrating an example radio environment in which embodiments of these teachings may be practiced.

The description below assumes a wireless communication system in which the radio access technology in use is 5G, and so the names of certain entities and messages reflect that radio access technology (for example, gNB is a 5G base station). This is not by way of limitation but to demonstrate a particularly detailed example deployment; these teachings are more broadly useful for radio environments in which data is sent uplink using parallel attempts on a contention-based channel and on a contention-free/scheduling-based channel. Further, the 5G radio access technology is still under development and so the names used herein by example may be changed once 5G is deployed commercially.

While document R1-1705616 proposes that GFUT and a corresponding SR can be transmitted simultaneously on respective scheduling-based and contention-based channels, there are several considerations in a practical system that appear not to have been previously explored or addressed. Some of these are outlined below.

The UE 10 may send the SR but for various reasons the gNB 20 does not receive it or cannot properly decode it.

It is possible the UE can send the SR in the contention-based channel.

The UE's UL data that is to be communicated with URLLC constraints as to reliability and delay may be too large to fit into the transport block size of the contention-based channel for GFUT.

The scheduling request may be sent as a part of extended content of a corresponding uplink channel (similar to the physical uplink control channel PUCCH in LTE/4G which allows the UE to send other UL control information such as a channel quality indication CQI and HARQ acknowledgement/negative-acknowledgement ACK/NACK as well).

It may be better to send the scheduling request and the GFUT in consecutive or different time slots (or different mini-slots of a same slot) before expecting related feedback (ACK/NACK and/or UL grant) from the serving gNB to improve time diversity and any needed coordination.

The scheduling request and the GFUT may indicate the UE's buffer status report BSR or some time critical factor that applies for the requested grant or next transmission of URLLC.

Embodiments of these teachings have both the GFUT and the SR sent from a UE in URLLC to provide diversity so as to enhance reliability of the data transfer while also taking advantage of the near-zero channel access delay of GFUT as much as possible for meeting the latency requirements of URLLC. As mentioned in the background section it has been previously considered for a UE with URLLC data to send use both GFUT and SR techniques, but these teachings provide a new scheme of coordinating between the GFUT and the corresponding SR to be sent by the UE with URLLC data for ensuring efficient operation and performance of both the UE and the serving gNB (or more broadly the serving radio access network RAN). As will be detailed below some aspects of this new scheme include adaptive triggers for sending the GFUT and corresponding SR, signaling elements included in the contents of the GFUT and of the corresponding SR, and certain behaviors of the UE and the gNB that relate to the coordination of the GFUT and the SR.

Begin with the straightforward assumption that FIG. 1 illustrates that GFUT and the corresponding SR are sent on two separate uplink channel resources, and at least the one which is used for GFUT is a contention-based channel in which multiple UEs contend for a transmission opportunity. The design of the SR for New Radio/5G is currently under development but it a reasonable assumption that the SR, at least for URLLC data, will be realized differently than the SR in LTE/4G. Specifically, the LTE/4G SR may be considered as two stages when used for re-initiating an UL transmission in LTE; the first stage SR is a single bit indicting the UE has UL data to send, in reply to this single bit the network allocates an UL resource on which the UE sends a more complete second-stage SR that includes a buffer status report. It is from this second-stage SR that the network gets sufficient information to schedule appropriate UL resources for the UE's data. It is reasonable to assume the SR for URLLC data will be able to carry more extended information than the one-bit SR the LTE UE initially sends, and for this reason the SR in the following example embodiments of these teachings will be referred to as the SR message. In embodiments of these teachings this SR message is not part of a two-stage SR, it is a singular SR sent by the UE from which the network can allocate resources appropriate for the UE's UL data waiting to be sent. It is also reasonable to assume that the GFUT will be designed for only small URLLC packets; for practical reasons most if not all contention-based channels are not able to carry large packets.

With these assumptions, the designated UL channel resources for sending the SR message and GFUT may be comparable. If the gNB has pools of channel resources available for sending GFUTs and SR messages, each of these pools may be suitable for sending either a GFUT or a SR message or at the very least the pool used for GFUT is also suitable for sending an SR message. In this regard the relevant (extended information) SR message may be considered as carrying information analogous to the contents of the PUCCH in the LTE system, namely the request for resources itself, a channel quality indication (CQI) and a HARQ ACK/NACK. It is known in the wireless radio arts that whenever using a contention based channel to send data (or even a scheduling request if that is the channel's protocol), the UE needs to also provide its identification (ID) along with the contention-based transmission.

As mentioned above and as further detailed below by examples, in some embodiments the SR message can be sent on the contention-based channel. The pool of resources allocated for SR messages (the contention-free channels)

can be shared among multiple UEs, and if the number of UEs is larger than the number of reserved contention-free channels some of these contention-free channels will be shared by more than one UE. In another deployment any UE is allowed to select any of the contention-free channels in the pool, though in this case there may be some contention for what is otherwise considered a contention-free channel. These occasional anomalies are well known in the radio arts and do not convert the contention-free channel into a contention-based one; the contention-free designation arises from the network's reserving that uplink channel primarily for UE scheduling requests but to avoid any mis-clarity the contention-free channels will be referred to hereinafter as scheduling-based channels. The reservation is 'primarily' for UE scheduling requests because, as detailed below, the UE may send a SR message in parallel on channels from both the scheduling-based and the contention-based pools of radio resources, and similarly the UE may send its URLLC data directly in parallel on channels from both the scheduling-based and the contention-based pools of radio resources.

Consider the above pools of resources the gNB has set aside for GFUT and SR messages as a respective first pool and second pool. The UEs are aware of these resource pools since they must know the channel on which to send their GFUT or their SR message prior to engaging in dedicated communications with the gNB, and so for example these pools may be broadcast in system information identifying which frequency channels correspond to which resource pools. In embodiments of these teachings the UE having URLLC data to send may be configured to use a self-selected pair of resources from those two pools adapted according to the following examples for a UE with a URLLC data packet to send.

In a first example the UE's current URLLC data packet does not fit in the transport block (TB) of a GFUT resource. In this case the UE may use the GFUT resource to duplicate the SR message sent on the scheduling-based channel that the UE selected from the SR/second pool of resources. That is, the SR message is now sent on both the SR resource the UE selects from the second/SR pool of resources and it is also sent on the GFUT resource that the UE selects from the first/GFUT pool of resources. For brevity this transmission of the same SR message on parallel GFUT/SR resources is denoted as SR+SR. The contents of this duplicated SR message may include a BSR which for example indicates the length/size of the data packet. The TB of a GFUT or the corresponding MAC PDU should indicate whether it is a duplicated SR or a GFUT small data packet. This SR+SR option enhances reliability of the SR message and allows for the serving gNB to schedule for the UE with an appropriate UL grant right away.

In a second example the current URLLC data packet does fit in the TB of a SR resource and the UE has no further URLLC data to send. In this case the UE may use the SR resource to duplicate the URLLC data instead such that the UE sends its URLLC data on a GFUT resource from the first/GFUT pool and in parallel sends its same URLLC data on a SR resource from the second/SR pool. For brevity this transmission of the entire URLLC data on parallel GFUT/SR resources is denoted as GFUT+GFUT (since the SR resource is used essentially as a GFUT). The transport block sent on the SR resource in this embodiment may include a specific indication whether or not the contents of this TB is a SR or a duplicated GFUT. In one variation of this second example embodiment, if the UE's first attempt of sending the duplication of the URLLC data packet fails, the UE's next attempt may be either sending an SR on a resource allocated for scheduling requests and the data on a resource allocated for contention-free access (denoted as SR+GFUT), or SR+SR as detailed above which may also include an indication that the first attempt has failed. This indication that the first attempt has failed served to alert the gNB/network so it can provide its best effort to ensure the next retransmission will be successful for URLLC. In this regard, both the SR message and the GFUT should indicate whether the underlying data is meant for a re-transmission and/or a last re-transmission. Said another way, this indication explicitly tells whether the underlying data is a first re-transmission, a second re-transmission, or a last re-transmission and so on in case multiple re-transmission is allowed.

The two examples above assume URLLC data which has the most demanding requirements. In a third example the UE's UL data has an ultra-high reliability requirement but its latency requirement is relaxed as compared to URLLC data. If the data size fits in the TB of the SR resource the GFUT+GFUT option may be used. If the data size does not fit in the TB of the SR resource or if the GFUT+GFUT option is reserved by the governing radio protocol only for URLLC data, then in this third example the UE can send its SR message on an SR resource and a duplicate of that SR message along with its ultra-high reliability UL data on the GFUT resource. For brevity this dual transmission is denoted as SR+SR/GFUT. If the size of this ultra-high reliability data is larger than one TB of a GFUT resource, in an embodiment the UE can, in parallel with sending its SR on the SR resource, send different portions of its ultra-high reliability UL data on multiple consecutive GFUT transmit opportunities/resources, of which only the first of these GFUT resources carries the duplicate of the SR message. If the UE receives a grant of dedicated resources in reply to (either copy of) its SR message, in an embodiment it should suspend further transmissions of this UL data on the GFUT resources and transmit the full amount of its high-reliability UL data on those granted dedicated resources. The gNB receiving that full amount of UL data on the granted dedicated resources may use soft-combining as known in the art for any portions of the UL data the gNB may have received separately on the various GFUT resources. Similar to the SR+SR option above, the buffer status report BSR may be included in the SR message; in one embodiment this BSR is included only in the duplicated SR message transmitted on the first GFUT resource and indicates how many GFUTs with this SR message the UE will be transmitting. In an alternative embodiment the UE includes a duplicate SR message in each of the GFUT resources in which it transmits a portion of its high-reliability UL data, and in this case the BSRs of these duplicated SR messages may each indicate how many GFUTs with this SR message the UE will be transmitting or only the first BSR transmitted on a GFUT resource indicates how many. These embodiments with different portions of the UL data transmitted on multiple GFUT resources assumes the layer 2 (L2) processing handles message segmentation and in-sequence delivery of the UE's ultra-high reliability UL data.

Now consider how the UEs may select the resources they utilize according to the above example embodiments from the first/GFUT and second/SR resource pools. In order to set aside certain resources for a more limited use so as to improve the reliability for sending URLLC data on those certain resources, in an embodiment the UE's selection of a resource from at least the GFUT pool may be enabled with a deterministic contention and polling based contention resolution. The network can enable this by configuring the first/GFUT resource pool and the relevant UEs so that each individual resource instance from the first/GFUT pool may be selected by only a limited number of certain UEs. Thus, when a contention happens on any particular resource instance of that first/GFUT pool, the network can at least determine all possible UEs which may be a cause of that collision and then poll each of them right away to resolve the contention without any additional delay.

The gNB will know in advance which UEs are conducting URLLC, for example upon each UE's connection and service request. It is reasonable that to meet the URLLC latency requirements that all of these URLLC UEs will be kept in the RRC CONNECTED state. However, some URLLC UEs in an inactive state may have a need to send occasional URLLC data. As one non-limiting example of such a deterministic contention, consider an example in which the first pool (allocated for GFUT) consists of 4 different resource instances. When there are 4 or fewer URLLC UEs being served in the cell by the gNB, each URLLC UE may be assigned with a dedicated resource instance from the first pool and so there would be no contention on any of those channels/instances. Once the number of UEs for URLLC increases above 4, the gNB may allocate each of those 4 resource instances to some specific URLLC UE when admitting individual UEs in the cell to be served. So if there are 8 URLLC UEs being served then each resource instance of the first pool will be shared by 2 specific URLLC UEs. In this manner the gNB will always know which resource instance of the first pool is allocated to which URLLC UE. If it happens that there is a contention among the sharing URLLC UEs on a given resource instance of the first pool that the gNB can detect, that gNB can readily determine which UEs are assigned to that resource instance and poll all of them right away. For the case of 2 URLLC UEs assigned to a given resource instance these two would be the contending UEs, but if for example there are 4 URLLC UEs assigned to a given resource instance on which there is contention the gNB would still poll all four of them since it will not know in advance which two (or more) caused the contention.

In general deterministic contention is known in the art. But as applied to these teachings and particularly to the first/GFUT pool of radio resources, this will provide the serving gNB with further information the prior art implementations will not give the gNB; namely in these teachings the gNB will know from the contention exactly what kind of TB size will or will not accommodate the UE's URLLC data and therefore what size UL resources the gNB should grant if in fact it needs to schedule any of the determined UEs to ensure success of retransmission. Such grant of UL resources would be needed anytime one of the UEs used the SR+SR option detailed above. The gNB's grant of UL resources may additionally indicate whether that UE receiving the resource grant should also send a duplication of the re-transmission on a selected resource from the GFUT pool.

In some practical implementations using the deterministic contention and polling described above, the resources primarily allocated for GFUT may not be available as frequently as those primarily allocated for SR for a certain UE, or vice versa. When they are both available to the UE at the same time the UE can send its parallel transmissions on the selected SR resource and on the selected GFUT resource in the same time slot or in the same mini-slot. Where these different resources are not available at the same time the UE can send its parallel transmissions on the selected SR resource and on the selected GFUT resource in consecutive slots before the expected feedback from the serving gNB. Where the UE sends its URLLC data on both resources the expected feedback is an ACK/NACK, and where the UE sends its SR message on both resources the expected feedback to the SR message sent on at least the SR resource is a grant of UL resources. In some instances there are advantages in using such consecutive slots; for example if the transmission on the SR resource is sent prior to sending the transmission on the GFUT the inherent time division enhances robustness.

In any of the above embodiments when the UE sends a SR message, the SR message also indicates whether it is meant for a first transmission or as a re-transmission and also whether or not the UE will also be attempting to send a GFUT right after sending the SR. As detailed above the SR message may also include a buffer status report (BSR). Similarly, when the UE sends its (URLLC) uplink data on the GFUT resource or the SR resource, the transmission of the uplink data may also indicate whether it is meant for a first transmission or as a re-transmission. And further as detailed above this transmission on the transmission of the uplink data may also include a buffer status report.

The UE may choose to send the SR message on the scheduling-based resource and in parallel send the uplink data on the contention-based resource like the third example above. In this case the UE may choose against the above GFUT+GFUT option based on the size of the uplink data to send and choose this SR+SR/GFUT over the above SR+SR example based on timing between these two selected resources. The gNB may, upon receiving the SR message in the SR resource, decide to schedule dedicated uplink resources right away for the UE, or it may choose to wait until it receives the UE's uplink data on the GFUT resource. The advantage in waiting is that the gNB can then acknowledge both SR messages and the uplink data, for example with a NACK coupled with an UL grant for a re-transmission or an ACK which in some implementations may also be coupled with an UL grant for a new transmission of the next packet. In some embodiments the UL resource grant may comprise a predefined strong UL diversity scheme in case the UE does not use the GFUT resource for duplication, or the gNB has not received the UE's transmission on the GFUT resource correctly, or the UL grant is for the last re-transmission. Such a strong UL diversity scheme may be implemented for example using cooperative multipoint (CoMP) transmissions and/or carrier aggregation-based duplication on physical/medium access control layers which is not applied for other communications except by specific exception/signaling.

In addition to the size of the uplink data to be sent and the timing between the pair of selected resources as detailed above, the transmission scheme of what to send on what particular resource may in certain embodiments depend on the absolute timing of the second radio resource in the second pool that is primarily allocated for scheduling-based channel access. To support URLLC, the 5G system (or other systems) may develop such that each URLLC UE is allocated with a dedicated sequence to send as a 1-bit SR (similar to the LTE first-stage SR) at certain pre-allocated time/frequency channel resources, for example which are available every $x^{th}$ mini-slot (which as mentioned may be a fraction of a 0.5 ms slot). In this regard the UE may select the transmission scheme of what content to send on which selected resources based on whether there is a transmission opportunity for the UE to send an extended SR message within the second pool that is near enough in time to meet the UE's latency requirements. If not, the UE can send the SR message on the selected contention-based (GFUT)

resource, either by itself or in an embodiment in parallel with the 1-bit SR that it will send on the pre-allocated scheduling-based (SR) resource it selects. In a special case, using dedicated sequence as 1-bit SR may replace the use of the second pool. In this special case, the UE, depending on the size of data to be sent, may determine to send either the data or the SR message on the selected contention based (GFUT) resource.

In certain deployments of these teachings the SR message and/or the uplink data that the UE sends in parallel may also include an indication (for example, 2 bits) that indicates whether the pair of messages to be sent on the SR and GFUT resources is SR+SR, SR+SR/GFUT or GFUT+GFUT. For the case of SR+SR and GFUT+GFUT transmissions from the UE, or even with the duplicated SR message sent in the SR+SR/GFUT example, the gNB may use redundancy combining of these parallel messages to improve its decoding reliability as is known in the art for original transmissions and HARQ re-transmissions of the same message.

Figure 2:
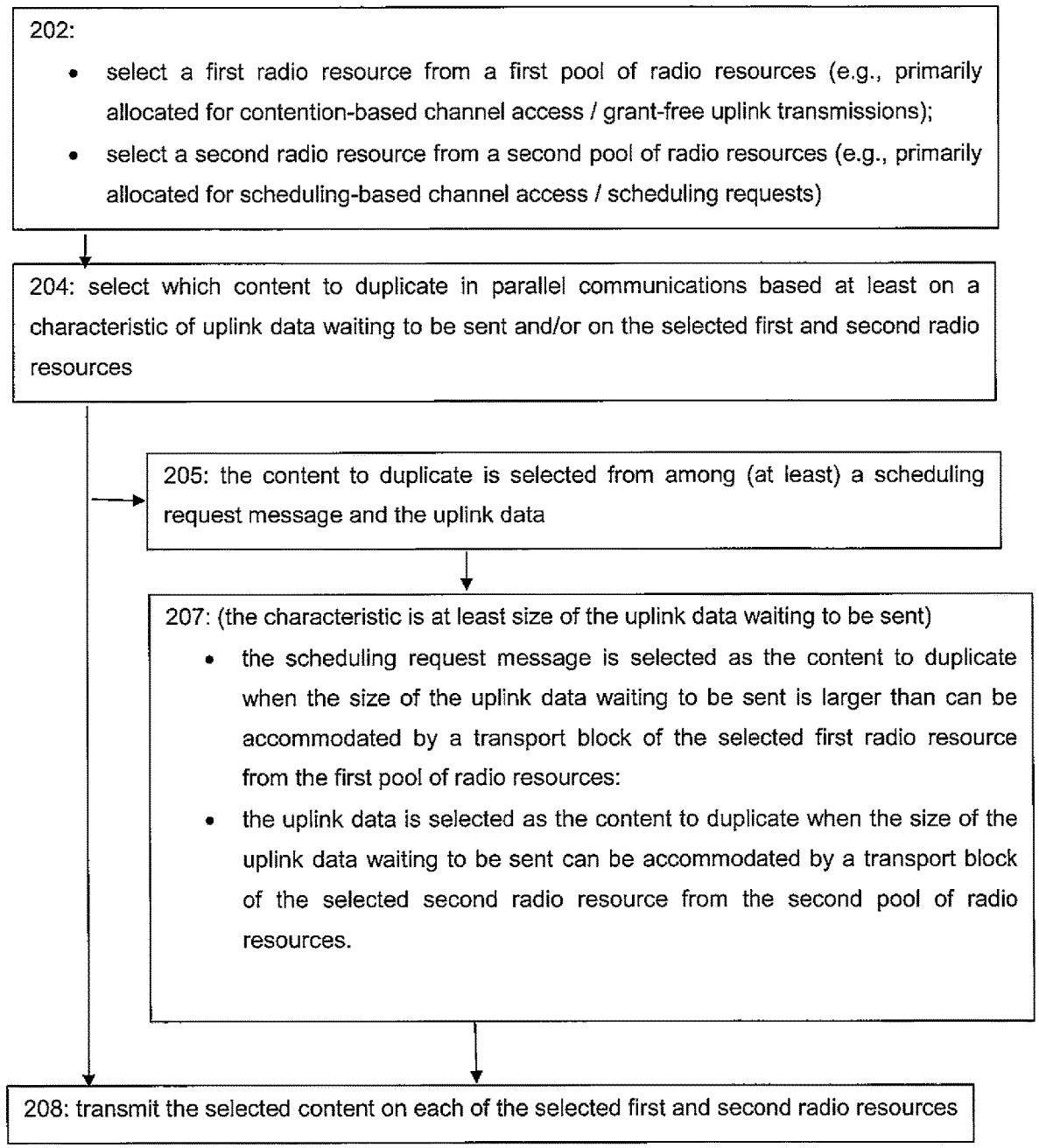
FIG. 2 is a process flow diagram illustrating a particular embodiment of these teachings from the perspective of the described user equipment.

FIG. 2 is a process flow diagram illustrating certain embodiments of these teachings from the perspective of the described UE, which at block 202 selects a first radio resource from a first pool of radio resources and it also selects a second radio resource from a second pool of radio resources. In a specific embodiment the first and second pools are primarily allocated for contention-based channel access and for scheduling-based channel access, respectively; and further these different pools of radio resources were more specifically described above as being primarily allocated for grant-free uplink transmissions of data and for scheduling requests, respectively. At block 204 the UE selects which content it will duplicate in parallel communications, and this selection is based at least a characteristic of uplink data waiting to be sent. In the above examples such a characteristic could be a size of uplink data waiting to be sent and/or a latency/reliability requirement of the uplink data waiting to be sent. In some embodiments it may also or alternatively be based on the selected first and second radio resources, and one of the examples above had this decision of which content to duplicate based at least in part on a timing difference between the selected first and second radio resources. Blocks 205 and 207 detail certain embodiments detailed by non-limiting examples above. More particularly, block 205 specifies the content to be duplicated and sent in parallel is selected from among (at least) a scheduling request message and the uplink data mentioned at block 204; and block 207 describes the 'based at least on a characteristic of uplink data from block 204 in that the characteristic is size of the uplink data, the scheduling request message is selected as the content to send when the size of the uplink data waiting to be sent is larger than can be accommodated by a transport block of the selected first radio resource, else the uplink data is selected as the content to send when the size of the uplink data waiting to be sent can be accommodated by a transport block of the selected second radio resource. With the resources and the content to duplicate now selected, block 208 concludes the figure with the UE transmitting the selected content on each of the selected first and second radio resources. Preferably these radio resources are in the same slot (or ideally the same mini-slot), but as with the examples above it may be they are transmitted in consecutive slots and constrained such that the resource that carries the later second of these parallel transmissions occurs earlier in time than when feedback is scheduled to be received from the earlier first of these parallel transmissions.

In one of the examples detailed more fully above, there was included an indication whether the content is a duplicate of the scheduling request message or the uplink data, and this particular indication was included with the content on only one of the selected radio resources on which the selected content is transmitted.

In another more particular example above, the parallel SR+SR or GFUT+GFUT transmissions that block 207 of FIG. 2 summarizes are performed in response to a failed attempt to send the SR message on another/different radio resource from the first pool in parallel with the uplink data being sent on another/different radio resource from the second pool. Or alternatively the parallel SR+SR or GFUT+GFUT transmissions that block 207 of FIG. 2 summarizes are attempted first and if the UE receives in response to that a NACK, it is then that the UE sends the SR message on another/different radio resource from the first pool in parallel with sending the uplink data on another/different radio resource from the second pool.

In the third example above for SR+SR/GFUT the scheduling request message is selected at block 204 as the content to duplicate and in this case the characteristic of block 204 is the size of the uplink data waiting to be sent which is larger than can be accommodated by a transport block of the selected first radio resource. In this example the transmitting of block 208 includes a) transmitting on the selected second radio resource the scheduling request message; and b) transmitting on the selected first radio resource the scheduling request message and a portion of the uplink data, where the scheduling request message comprises an indication of a total number of consecutive radio resources from the first pool to be expected. Such an indication can be the total number, the total number less the GFUT resource that carries the indication, or some other number that tells the gNB receiving it just how many GFUT resources from the first pool the UE expects to use for transmitting all portions of the uplink data.

In some of the more specific implementation examples above the parallel transmissions of the scheduling request message or the uplink data that are transmitted on each of the selected first and second radio resources further indicates if the respectively transmitted content is a first transmission or a re-transmission, and in other of such specific implementations where the selected content to be transmitted in parallel is the scheduling request message this SR message is transmitted with a buffer status report that indicates a length/size of the uplink data to be sent. When the UE transmits SR+SR or GFUT+GFUT, the UE may at block 202 of FIG. 2 select multiple radio resources from the second pool of radio resources primarily allocated for scheduling-based channel access, in which case it will then transmit at block 208 the selected content on the selected first radio resource and on the selected multiple second radio resources. This particular embodiment has multiple instances of the SR message or the uplink data transmitted on multiple contention-free resources.

Figure 3:
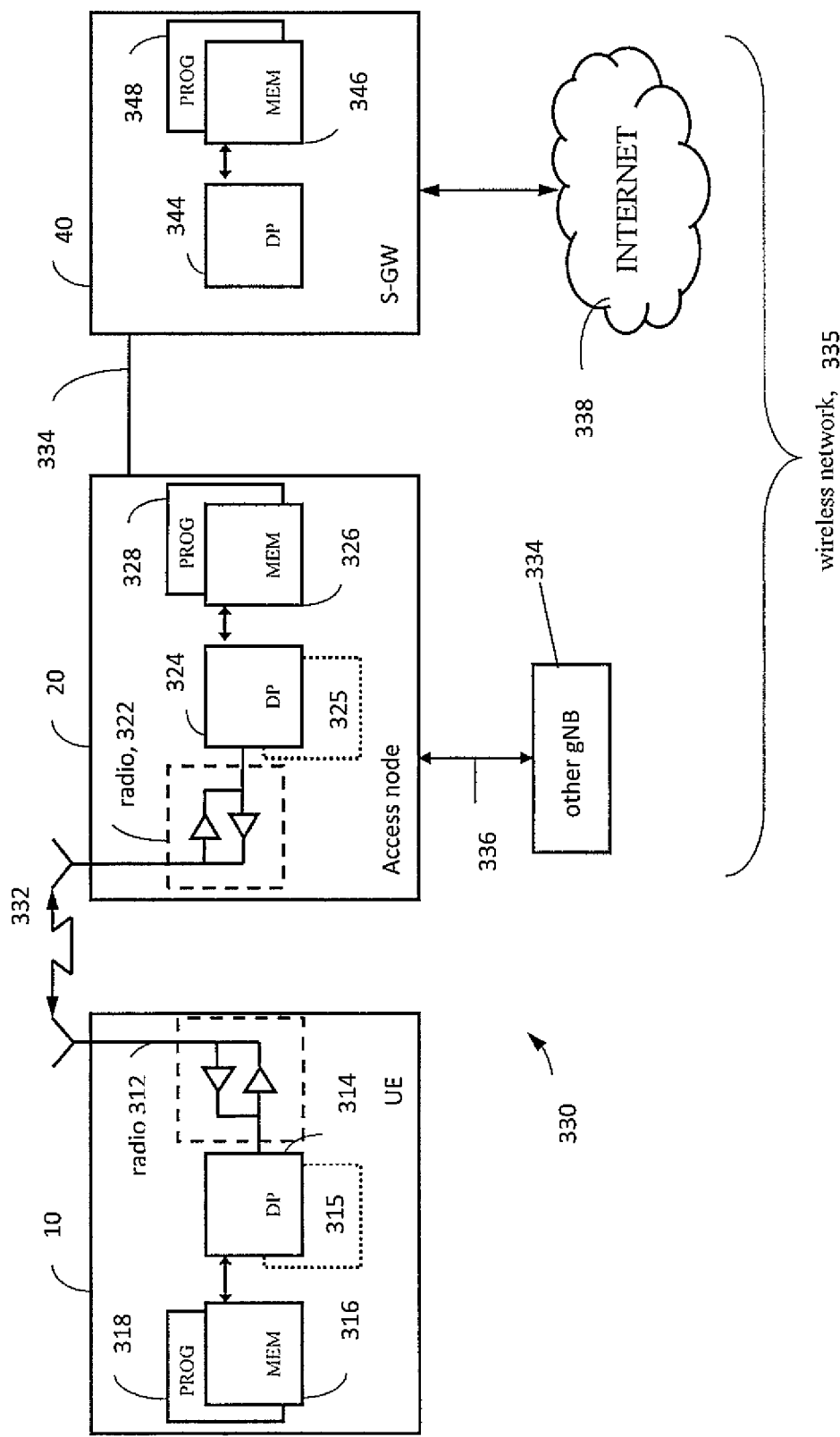
FIG. 3 is a high level schematic block diagram showing further components of the source/target cells and UE that are suitable for practicing certain aspects of these teachings.

FIG. 3 is a high level diagram illustrating some relevant components of various communication entities that may implement various portions of these teachings, including a source base station identified generally as a source or serving radio network access node 20, a serving gateway (S-GW) 40 which may be co-located with a mobility management entity (MME), and a user equipment (UE) 10. There may also be other access nodes such as gNBs or eNBs as shown by the radio access node 334. In the wireless system 330 of FIG. 3 a communications network 335 is adapted for communication over a wireless link 332 with an apparatus, such as a mobile communication device which may be referred to as a UE 10, via a serving radio network access node 20. The network 335 may include a S-GW 40 that provides connectivity with other and/or broader networks such as a publicly switched telephone network and/or a data communications network (e.g., the internet 338).

The UE 10 includes a controller, such as a computer or a data processor (DP) 314 (or multiple ones of them), a computer-readable memory medium embodied as a memory (MEM) 316 (or more generally a non-transitory program storage device) that stores a program of computer instructions (PROG) 318, and a suitable wireless interface, such as radio frequency (RF) transceiver or more generically a radio 312, for bidirectional wireless communications with the source radio network access node 20S via one or more antennas. In general terms the UE 10 can be considered a machine that reads the MEM/non-transitory program storage device and that executes the computer program code or executable program of instructions stored thereon. While each entity of FIG. 3 is shown as having one MEM, in practice each may have multiple discrete memory devices and the relevant algorithm(s) and executable instructions/program code may be stored on one or across several such memories.

In general, the various embodiments of the UE 10 can include, but are not limited to, mobile user equipments or devices, cellular telephones, smartphones, wireless terminals, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, as well as portable units or terminals that incorporate combinations of such functions.

The serving radio network access node 20 also includes a controller, such as a computer or a data processor (DP) 324 (or multiple ones of them), a computer-readable memory medium embodied as a memory (MEM) 326 that stores a program of computer instructions (PROG) 328, and a suitable wireless interface, such as a RF transceiver or radio 322 (with transmitter and receiver), for communication with the UE 10 via one or more antennas. The serving radio network access node 20 may be coupled via a data/control path 334 to the S-GW 40. The path 334 may be implemented as an S1 interface or something similar thereto.

The serving radio network access node 20 may also be coupled to other radio network access nodes 334 via data/control path 336, which may be implemented as an X5 or similar interface. At the level of detail shown at FIG. 3 the other radio network access node 334 has components substantially similar to those detailed above for the serving radio network access node 20, and will not be repeated therefor.

The S-GW 40 includes a controller, such as a computer or a data processor (DP) 344 (or multiple ones of them), a computer-readable memory medium embodied as a memory (MEM) 346 that stores a program of computer instructions (PROG) 348.

At least one of the PROGs 318, 328 is assumed to include program instructions that, when executed by the associated one or more DPs, enable the device to operate in accordance with exemplary embodiments of this invention. That is, various exemplary embodiments of this invention may be implemented at least in part by computer software executable by the DP 314 of the UE 10; and/or by the DP 324 of the serving radio network access nodes 20; and/or by hardware, or by a combination of software and hardware (and firmware).

For the purposes of describing various exemplary embodiments in accordance with this invention the UE 10 and the serving radio network access nodes 20 may also include dedicated processors 315 and 325 respectively.

The computer readable MEMs 316, 326 and 346 may be of any memory device type suitable to the local technical environment and may be implemented using any suitable data storage technology, such as semiconductor based memory devices, flash memory, magnetic memory devices and systems, optical memory devices and systems, fixed memory and removable memory. The DPs 314, 324 and 344 may be of any type suitable to the local technical environment, and may include one or more of general purpose computers, special purpose computers, microprocessors, digital signal processors (DSPs) and processors based on a multicore processor architecture, as non-limiting examples. The wireless interfaces (e.g., RF transceivers 312 and 322) may be of any type suitable to the local technical environment and may be implemented using any suitable communication technology such as individual transmitters, receivers, transceivers or a combination of such components.

A computer readable medium may be a computer readable signal medium or a non-transitory computer readable storage medium/memory. A non-transitory computer readable storage medium/memory does not include propagating signals and may be, for example, but not limited to, an electronic, magnetic, optical, electromagnetic, infrared, or semiconductor system, apparatus, or device, or any suitable combination of the foregoing. Computer readable memory is non-transitory because propagating mediums such as carrier waves are memoryless. More specific examples (a non-exhaustive list) of the computer readable storage medium/memory would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

It should be understood that the foregoing description is only illustrative. Various alternatives and modifications can be devised by those skilled in the art. For example, features recited in the various dependent claims could be combined with each other in any suitable combination(s). In addition, features from different embodiments described above could be selectively combined into a new embodiment. Accordingly, the description is intended to embrace all such alternatives, modifications and variances which fall within the scope of the appended claims.

A communications system and/or a network node/base station may comprise a network node or other network elements implemented as a server, host or node operationally coupled to a remote radio head. At least some core functions may be carried out as software run in a server (which could be in the cloud) and implemented with network node functionalities in a similar fashion as much as possible (taking latency restrictions into consideration). This is called network virtualization. "Distribution of work" may be based on a division of operations to those which can be run in the cloud, and those which have to be run in the proximity for the sake of latency requirements. In macro cell/small cell networks, the "distribution of work" may also differ between a macro cell node and small cell nodes.

Network virtualization may comprise the process of combining hardware and software network resources and network functionality into a single, software-based administrative entity, a virtual network. Network virtualization may involve platform virtualization, often combined with resource virtualization. Network virtualization may be categorized as either external, combining many networks, or parts of networks, into a virtual unit, or internal, providing network-like functionality to the software containers on a single system.

The following abbreviations that may be found in the specification and/or the drawing figures are defined as follows:

3GPP Third Generation Partnership Project
ACK/NACK acknowledgement/negative-acknowledgement
BSR buffer status report
CQI channel quality indication/indictor
E-UTRAN evolved UMTS radio access network
GFUT grant-free uplink transmission (of data)
gNB base station of a 5G/new radio system
HARQ hybrid-automatic-repeat-request
LTE long term evolution (of E-UTRAN)
MAC PDU medium access control protocol data unit
PUCCH physical uplink control channel
SR scheduling request
TB transport block
UE user equipment
UL uplink
UMTS universal mobile telecommunications service
URLLC ultra-reliable low-latency communications

What is claimed is:

1. A method comprising:
    selecting for a user equipment a first radio resource from a first pool of radio resources;
    selecting a second radio resource from a second pool of radio resources;
    selecting which content to duplicate on parallel communications based on at least one of a size of uplink data waiting to be sent, a timing difference between the selected first radio resource and second radio resource, or a latency and a reliability requirement of the uplink data waiting to be sent,
    wherein, when based on the size of uplink data waiting to be sent, the selecting which content to duplicate comprises at least one of:
        content of a scheduling request message is selected as the content to duplicate based on the size of the uplink data waiting to be sent is larger than can be accommodated by a transport block of the selected first radio resource from the first pool of radio resources, or
        content of the uplink data is selected as the content to duplicate based on the size of the uplink data waiting to be sent can be accommodated by a transport block of the selected second radio resource from the second pool of radio resources,
    wherein one of:
        the selecting the scheduling request message and the uplink data is in response to a failed attempt to send the scheduling request on another radio resource from the first pool in parallel with the uplink data being sent on another radio resource from the second pool;
        or
        the scheduling request is sent on another radio resource from the first pool in parallel with the uplink data being sent on another radio resource from the second pool in response to receiving a negative acknowledgement to the transmitting, and
    wherein the selected content to duplicate comprises content from at least the scheduling request message for the user equipment and the uplink data; and
    transmitting the selected content on each of the selected first radio resource and the selected second radio resource.

2. The method according to claim 1, wherein:
    the transmitting comprises:
        transmitting on the selected second radio resource the scheduling request message; and
        transmitting on the selected first radio resource the scheduling request message and a portion of the uplink data, where the scheduling request message transmitted on the selected first radio resource comprises an indication of a total number of consecutive radio resources from the first pool to be expected.

3. The method according to claim 1, wherein:
    on only one of the selected first radio resource or the selected second radio resource the selected content is transmitted with an indication that the content is a duplicate.

4. The method according to claim 1, wherein the scheduling request message or the uplink data transmitted on each of the selected first radio resource and second radio resource further indicates if the respectively transmitted content is a first transmission or a re-transmission.

5. The method according to claim 1, wherein the selected content is the scheduling request message and is transmitted with a buffer status report indicating a length of the uplink data to be sent.

6. The method according to claim 1, wherein:
    multiple radio resources are selected from the second pool of radio resources; and
    the selected content is transmitted on the selected first radio resource and on the multiple radio resources selected from the second pool of radio resources.

7. The method according to claim 1, wherein the transmitting the selected content on each of the selected first radio resource and the selected second radio resource is for grant-free uplink transmissions of data.

8. The method according to claim 1, wherein:
    the first pool of radio resources is primarily allocated for contention-based channel access; and
    the second pool of radio resources is primarily allocated for scheduling-based channel access.

9. An apparatus comprising:
    at least one non-transitory memory storing instructions; and
    at least one processor;
    wherein the at least one non-transitory memory storing instructions is executed by the at least one processor to cause the apparatus to:
        select for a user equipment a first radio resource from a first pool of radio resources;
        select a second radio resource from a second pool of radio resources;
        select which content to duplicate in parallel communications based on at least one of a size of uplink data waiting to be sent, a timing difference between the selected first radio resource and second radio resource, or a latency and a reliability requirement of the uplink data waiting to be sent, wherein, when based on the size of uplink data waiting to be sent, the selecting which content to duplicate comprises at least one of:
content of a scheduling request message is selected as the content to duplicate based on the size of the uplink data waiting to be sent is larger than can be accommodated by a transport block of the selected first radio resource from the first pool of radio resources, or
content of the uplink data is selected as the content to duplicate based on the size of the uplink data waiting to be sent can be accommodated by a transport block of the selected second radio resource from the second pool of radio resources,
wherein one of:
the selecting the scheduling request message and the uplink data is in response to a failed attempt to send the scheduling request on another radio resource from the first pool in parallel with the uplink data being sent on another radio resource from the second pool;
or
the scheduling request is sent on another radio resource from the first pool in parallel with the uplink data being sent on another radio resource from the second pool in response to receiving a negative acknowledgement to the transmitting, and
wherein the selected content to duplicate comprises content from at least the scheduling request message for the user equipment and the uplink data; and
transmit the selected content on each of the selected first radio resource and the selected second radio resource.

10. The apparatus according to claim 9, wherein:
the first pool is primarily allocated for contention-based channel access.

11. The apparatus according to claim 9, wherein:
the scheduling request message is transmitted on the selected second radio resource; and
the scheduling request message and a portion of the uplink data are transmitted on the selected first radio resource, where the scheduling request message transmitted on the selected first radio resource comprises an indication of a total number of consecutive radio resources from the first pool to be expected.

12. The apparatus according to claim 9, wherein:
on only one of the selected first radio resource or the selected second radio resource the selected content is transmitted with an indication that the content is a duplicate.

13. The apparatus according to claim 9, wherein at least one of:
the scheduling request message or the uplink data transmitted on each of the selected first and second radio resources further indicates if the respectively transmitted content is a first transmission or a re-transmission; and
the selected content is the scheduling request message and is transmitted with a buffer status report indicating a length of the uplink data to be sent.

14. The apparatus according to claim 9, wherein selecting which content to duplicate is based on at least one of:
size of the uplink data waiting to be sent;
a timing difference between the selected first and second radio resources;
a latency requirement of the uplink data waiting to be sent; and
a reliability requirement of the uplink data waiting to be sent.

15. A non-transitory memory storing instructions that, when executed by one or more processors, cause an apparatus to perform actions comprising:
selecting, by a user equipment, a first radio resource from a first pool of radio resources;
selecting a second radio resource from a second pool of radio resources;
selecting which content to duplicate in parallel communications based on at least one of a size of uplink data waiting to be sent, a timing difference between the selected first radio resource and second radio resource, or a latency and a reliability requirement of the uplink data waiting to be sent,
wherein one of:
the selecting the content to duplicate is in response to a failed attempt to send the scheduling request on another radio resource from the first pool in parallel with the uplink data being sent on another radio resource from the second pool;
or
the scheduling request is sent on another radio resource from the first pool in parallel with the uplink data being sent on another radio resource from the second pool in response to receiving a negative acknowledgement to the transmitting, and
wherein, when based on the size of uplink data waiting to be sent, the selecting comprises at least one of:
content of a scheduling request message is selected as the content to duplicate based on the size of the uplink data waiting to be sent is larger than can be accommodated by a transport block of the selected first radio resource from the first pool of radio resources, or
content of the uplink data is selected as the content to duplicate based on the size of the uplink data waiting to be sent can be accommodated by a transport block of the selected second radio resource from the second pool of radio resources, and
wherein the selected content to duplicate comprises content from at least Raphe scheduling request message for the user equipment and the uplink data; and
transmitting the selected content on each of the selected first radio resource and the selected second radio resource.

16. The non-transitory memory according to claim 15, wherein the second pool is primarily allocated for scheduling-based channel access.

17. The non-transitory memory according to claim 15, wherein the transmitting comprises;
transmitting on the selected second radio resource the scheduling request message; and
transmitting on the selected first radio resource the scheduling request message and a portion of the uplink data, where the scheduling request message transmitted on the selected first radio resource comprises an indication of a total number of consecutive radio resources from the first pool to be expected.

18. The non-transitory memory according to claim 15, wherein selecting which content to duplicate is based on at least one of:
a timing difference between the selected first and second radio resources;
a latency requirement of the uplink data waiting to be sent; and a reliability requirement of the uplink data waiting to be sent.

\* \* \* \* \*